United States Patent
Yang et al.

(10) Patent No.: US 9,736,677 B2
(45) Date of Patent: Aug. 15, 2017

(54) CLOUD IDENTIFICATION METHOD, DEVICE AND SYSTEM FOR A DOUBLE-CARD MOBILE COMMUNICATIONS DEVICE

(71) Applicant: SHANGHAI CHULE (COOTEK) INFORMATION TECHNOLOGY CO., LTD., Shanghai (CN)

(72) Inventors: Chengxiao Yang, Shanghai (CN); Chao Yuan, Shanghai (CN); Kan Zhang, Shanghai (CN); Meng Zhang, Shanghai (CN); Wenyu Ye, Shanghai (CN)

(73) Assignee: Shanghai Chule (COOTEK) INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/110,951

(22) PCT Filed: Jan. 13, 2015

(86) PCT No.: PCT/CN2015/070623
§ 371 (c)(1),
(2) Date: Sep. 12, 2016

(87) PCT Pub. No.: WO2015/106675
PCT Pub. Date: Jul. 23, 2015

(65) Prior Publication Data
US 2017/0026825 A1    Jan. 26, 2017

(30) Foreign Application Priority Data
Jan. 17, 2014    (CN) .......................... 2014 1 0023177

(51) Int. Cl.
*H04M 1/00*    (2006.01)
*H04W 8/18*    (2009.01)
(Continued)

(52) U.S. Cl.
CPC ............. *H04W 8/183* (2013.01); *H04L 67/10* (2013.01); *H04W 88/06* (2013.01)

(58) Field of Classification Search
CPC ...... H04L 67/10; H04W 88/06; H04W 8/183; H04W 76/025; H04W 60/005
(Continued)

(56) References Cited

U.S. PATENT DOCUMENTS 8,731,539 B2 * 5/2014 Lin ........................ H04W 24/02
                                                    370/343
8,843,124 B2 * 9/2014 Fan ..................... H04M 3/42178
                                                    455/419

FOREIGN PATENT DOCUMENTS

CN         1829344 A      9/2006
CN    200510088756 A      9/2006
(Continued)

OTHER PUBLICATIONS

International Search Report Issued on Apr. 14, 2015, for PCT/CN2015/070623.
(Continued)

*Primary Examiner* — Eugene Yun
(74) *Attorney, Agent, or Firm* — Flener IP Law; Zareefa B. Flener

(57) ABSTRACT

The present invention provides a cloud identification method, device and system for a double-card mobile communications device. The cloud identification method is applicable to a double-card mobile communications terminal or a device in communication with the double-card mobile communications terminal. The method comprises: detecting whether a configuration factor matching each SIM card exists in a mobile communications terminal, and when the matched configuration factor exists, implementing matching, the configuration factor comprising at least one of basic parameter and an implementation function for provid-
(Continued)

ing a complete communications function; when the matching configuration factor does not exist, analyzing a system function or data, or monitoring and analyzing a system event of a conversation process, and obtaining a matching configuration factor; applying the obtained configuration factor to the mobile communications terminal application to complete the matching, and saving the basic parameter and the implementation function. The present invention changes a conventional obtaining mode, and greatly saves manpower and financial resources.

26 Claims, 4 Drawing Sheets

(51) Int. Cl.
    *H04B 1/38*     (2015.01)
    *H04L 29/08*     (2006.01)
    *H04W 88/06*     (2009.01)

(58) Field of Classification Search
    USPC ........................................................ 455/558
    See application file for complete search history.

(56) References Cited

FOREIGN PATENT DOCUMENTS

| | | |
|---|---|---|
| CN | 101110062 A | 1/2008 |
| CN | 200710148616 A | 1/2008 |
| CN | 101267631 A | 4/2008 |
| CN | 200810089261 A | 4/2008 |
| CN | 101788998 A | 7/2010 |
| CN | 200910251391 A | 7/2010 |
| CN | 102572074 A | 12/2010 |
| CN | 201010602285 A | 12/2010 |
| CN | 102075903 A | 5/2011 |
| CN | 201010559777 A | 5/2011 |
| CN | 102724657 A | 10/2012 |
| CN | 201210202859 A | 10/2012 |

OTHER PUBLICATIONS

Written Opinion of the International Search Authority, Issued on Apr. 14, 2015, for PCT/CN2015/070623.

* cited by examiner

CLOUD IDENTIFICATION METHOD, DEVICE AND SYSTEM FOR A DOUBLE-CARD MOBILE COMMUNICATIONS DEVICE

FIELD OF THE INVENTION

The present invention relates to the data processing field, and more particularly, to a cloud identification method, device and system for a dual-sim mobile communications device.

BACKGROUND OF THE INVENTION

In recent years, with the popularization of mobile communications, more and more people have multiple sim cards. For example, some people own several sim cards of different carrier operators because they have to travel to and fro between many places due to work. For another example, some people own several sim cards which belong to different operators, such as China Mobile, China Unicorn and Telecommunications. Take another example, some people own multiple SIM cards in order to distinguish work phone and private phones.

Dual SIM Dual Standby (DSDS) phones emerge for users with multiple sim cards to provide more convenient calling experiences. A DSDS phone means that one phone can be installed with two SIM cards, which are in standby. In addition, corresponding to different network types, dual-model-dual-standby-mobile phones emerge, that is, two SIM cards on the same mobile phone belong to different network types. For example, one SIM card supports GSM network while the other one supports CDMA network.

With the popularity of smart phones, users criticize them for inconvenient use of the built-in dialing system and failure in meeting their demands and many third-party communication softwares emerge. At present, common third-party communications softwares treat a mobile terminal device to be a single-SIM phone as default so no smart third-party communication software matches the dual-sim phones for users intelligently. The reason the third-party communication software cannot be still applicable to the dual-sim phone is because the following problems exist.

Firstly, limited by cellphone manufacturers, the third-party communication software cannot directly acquire configuration factors of the dual-sim phone, such as basic parameters of each slot, or invoke SIM card in the slot to implement implementation functions of corresponding functions which may cause the third-party communication software to fail in taking full control of system communication and providing complete function experiences to users. For examples, users cannot get missed calls or call logs cannot be displayed, or users cannot swap in SIM cards to make calls or locate or store contacts. Such third-party communication softwares have been far from enough to meet users' demands.

Currently, the regular method to obtain configuration factors of a dual-sim phone is to buy a dual-sim phone with a specific model and decompile the phone model to obtain configuration factors of each slot. However, confronting abundance of innovative dual-sim phones from many manufacturers, it is impossible to buy each new model for decompling to obtain corresponding configuration factors, and it is not realistic from a cost perspective.

Secondly, different cellphone manufacturers have different naming or defining methods about the configuration factors of dual-sim phones, and even the same cellphone manufacturer have different configuration factors of the same dual-sim phone model due to different production batches. Although the the configuration factors can be obtained by decompling the dual-sim phone with a certain model results cannot be applied in dual-sim phones with other models, even in dual-sim phones of different batches from the same manufacturer with the same model. After the dual-sim phone with the same model is decomplied to obtain configuration factors, and the user switches on and off the phone or plug in or out SIM cards repeatedly, existing configuration factors will change and such updated configuration factors are different depending on different users, so it is unrealistic to customize configuration factors for each user.

Confronted with large numbers of dual-sim users and dual-sim phone models which are updated at any time, how to respond user's demands and realize rapid intelligent identification of the dual-sim phone model becomes an urgent problem for third-party communication softwares.

DESCRIPTION OF THE INVENTION

To solve the technical proposals, the present invention provides an identification method, device and system to rapidly and conveniently identify configuration factors of each SIM card in the dual-sim mobile terminal device.

According to one aspect of the invention, the invention provides a dual-sim cloud identification method which is applicable to a double-SIM mobile terminal or a double-SIM mobile terminal device, wherein, the method comprises: detecting whether configuration factors matching the SIM card exist in the mobile communications terminal. When matched configuration factors exist, completing the matching. The configuration factors may comprise basic parameters for providing a complete communication function, implementation functions for providing a complete communication function or the above both. When matched configuration factors do not exist, analyzing system functions or data, or monitoring and analyzing system events of a mobile communications terminal conversation process to obtain matched configuration factors. Applying obtained matching configuration factors in the mobile communication terminals to complete the matching of the mobile communication terminals and saving configuration factors.

According to one aspect of the invention, the invention provides a dual-sim cloud identification system, comprising: a mobile communication terminal, a database for saving the mobile communication terminal model and matched configuration factors; a dual-sim cloud identification device, for communicating with the mobile communication terminal and the database to implement the matching of the mobile communications terminal. The dual-sim cloud device may also comprise: a configuration factor query module for querying whether configuration factors matching the mobile communication terminals exist in the database; a configuration factor obtaining module for analyzing system functions or data, or monitoring and analyzing system events of a conversation system, to obtain configuration factors matching SIM card in the mobile communication terminal; a configuration factor recording module for recording the mobile communication terminals model and configuration factors obtained by the configuration factor obtaining module in the database. The configuration factors comprise at least one of basic parameters and implementation functions for provide a complete communication function.

According to one aspect of this invention, the invention provides a mobile communication device, including a dual- SIM slot; a query module for sending inspection data to test if there are configuration factors matching mobile communication terminals and receive matching results of the mobile communication terminals; an obtaining module for monitoring and analyzing the system communication process to obtain configuration factors of communication terminals; a transmission module for transmitting obtained configuration factors via a network. Wherein, configuration factors comprise at least one of basic parameters and implementation functions to provide complete communication functions.

According to one aspect of this invention, the invention provides a network device communicating with the designated mobile communication terminal. The network device comprises: receiving module for receiving instructions or data from a mobile communication terminal. The designated mobile communication terminal is a dual-sim device; a database for saving the mobile communication terminal model and matched configuration factors; the matched configuration factors comprise at least one of basic parameters and implementation functions for provide a complete communication function; a query module for querying in the database according to instruction or data received by the receiving module and feeding back a query result; an obtaining module for comparing and analyzing data received by the receiving module to obtain configuration factors corresponding to the mobile communications terminal when matched configuration factors do not exist in the mobile communications terminal; a saving module for saving configuration factors obtained by the obtaining module in the database.

According to one aspect of this invention, the invention provides a dual-sim cloud identification method, comprising: analyzing system functions or data of the mobile communications terminal, or determining whether the mobile communications terminal is a dual-sim device according to the model of the communications terminal; detecting whether configuration factors matching each SIM card exist in a mobile communications terminal when confirming that the mobile communications terminal is a dual-sim device, wherein the configuration factors comprise at least one of basic parameters and implementation functions for providing a complete communications function; according to detecting results, completing the matching of communications terminal.

According to one aspect of this invention, the invention provides a dual-sim cloud identification method, comprising: a mobile communications terminal; a database saving the model of the mobile communication terminal and matched configuration factors; a dual-sim cloud identification device for communicating with the mobile communications terminal and the database; wherein, the dual-sim device determines whether the mobile communications terminal is a dual-sim model, according to the model of the mobile communications terminal or by analyzing system functions or data of the mobile communications terminal; when the mobile communications terminal is a dual-sim model, the dual-sim cloud identification device query whether matched configuration factors matching the mobile communications terminal exist in the database to implement the matching; the configuration factors comprise at least one of basic parameters and implementation functions for providing complete communications functions.

According to one aspect of this invention, the basic parameters may comprise one of the following data or combination thereof: corresponding slot parameters for each SIM card, slot parameters performing call-out communications, slot parameters performing call-in communications and corresponding slot parameters for call logs. In other embodiments, the basic data may also comprise other parameters which produce symbolic influences on communications of the mobile communications terminal during the work.

According to one aspect of this invention, the implementation functions may be one or many of the following functions: an implementation function identifying SIM number, an implementation function identifying the status of SIM card, an implementation function identifying SIM network attribute and an implementation function identifying SIM operator attribute. In other embodiments, the implementation functions may be others identifying basic functional attributes of SIM cards.

Comparing to prior arts, in some embodiments of the invention, by scanning the system function to obtain corresponding implementation functions and monitoring and analyzing the system communications process to obtain corresponding basic parameters, necessary configuration factors are obtained for the dual-sim mobile communication terminal to perform a complete communication function, so it may exclude a decompiling which the conventional obtaining modes rely on and it is not necessary to keep up the pace of the manufacturers to buy new phone models. The present invention greatly saves manpower and financial resources of third-party communications software development.

On the other hand, some embodiments of the invention are determining whether the mobile communications terminal is a dual-sim model according to system functions or data or models and querying matched configuration factors in a database to implement the matching of the mobile communications terminal, so it is possible to quickly and accurately determine whether the mobile communications terminal is a dual-sim model, and implement the matching.

BRIEF INTRODUCTION OF THE DRAWINGS

The embodiments of the invention will be described by referring to the accompanying drawings, from which its above and other characteristics and advantages will be evident:

DETAILED DESCRIPTION OF THE PREFERRED EMBODIMENTS

Now embodiments are described fully by referring to attached figures.

Figure 1:
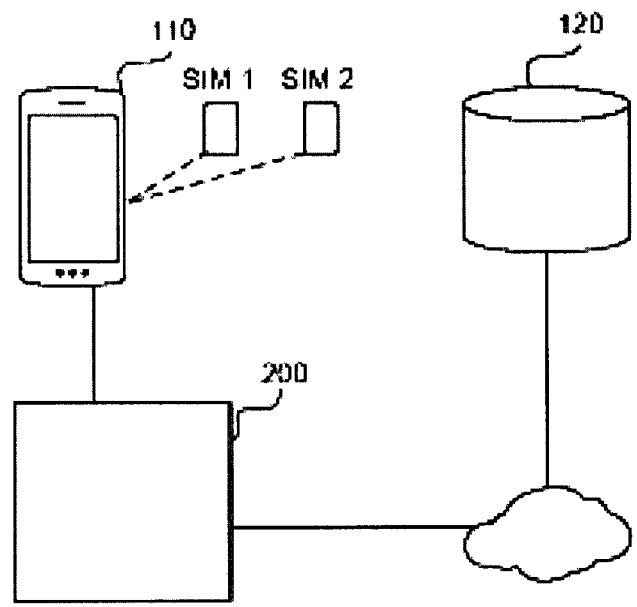
FIG. 1 shows the schematic diagram for one embodiment of the dual-sim cloud identification system.

For referred FIG. 1. FIG. 1 shows the frame schematic diagram of one embodiment of the dual-sim cloud identification system, at least comprising: dual-sim mobile communications terminal 110, database 120 saving the mobile communications terminal model and matched configuration factors and dual-sim cloud identification device 200.

The dual-sim identification device 200 communicates with the mobile communications terminal 110 and the database 120. Specifically speaking, the dual-sim identification device 200 determines whether the mobile communications terminal 110 is a dual-sim model by obtaining the model of the mobile communications terminal 110 or analyzing part or all of its system functions or data. For example, the database 120 can summarize all models of the dual-sim mobile communications terminals, the dual-sim cloud identification device 200 obtains the model of the mobile communications terminal 110, and queries the database 200, to determine whether the mobile communications terminal 110 is a dual-sim model; or the dual-sim cloud identification device 200 queries system functions of the mobile communications terminal 110 and determines whether the mobile communications terminal 110 is a dual-sim model according to numbers of parameters indicating the slot; or the dual-sim cloud identification device 200 queries system functions of the mobile communications terminal 110 via setting the function name of the implementation function or the string of its subset; or the dual-sim cloud identification device 200 compares implementation functions of the mobile communications terminal 110 with the summarized results about possible naming methods of implementation functions of each dual-sim devices in order to obtain the preset implementation function.

When the dual-sim device 200 determines that the mobile communications terminal 110 is a dual-sim phone, the dual-sim device 200 queries configuration factors matching the mobile communications terminal in order to implement the matching the configuration factors comprise one of basic parameters and implementation functions for providing a complete communications function or its combination.

Figure 2:
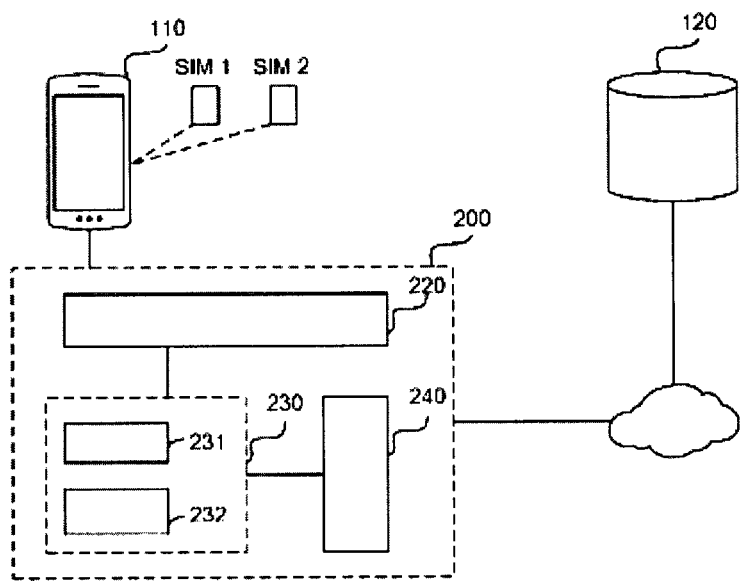
FIG. 2 shows the schematic diagram for another embodiment of the dual-sim cloud identification system.

For referred FIG. 2, in another embodiment of the dual-sim cloud identification system, the dual-sim cloud identification device 200 may comprise configuration factor query module 200, configuration element obtaining module 230 and configuration factor recording module 240.

When confirming that at least two-SIM cards exist in the mobile communications terminal 110, the mobile communications terminal 210 queries in the database 120 via the configuration factors query module 220. When configuration factors matching the mobile communications terminal 110 exist, feedback the matched configuration factors and use them to operate the mobile communications terminal 110. When configuration factors matching the mobile communications terminal 110 do not exist, trigger configuration factors obtaining module 220 to obtain configuration factors of each SIM card in it and record its model and obtained configuration factors in the database 120 via the configuration factors record module 240.

Specifically speaking configuration factors obtaining module 230 may also comprise: basic parameters obtaining module 231 for monitoring the system conversation process of the mobile communications terminal 110 to obtain basic parameters; implementation functions obtaining module 232 for scanning system functions, to obtain implementation functions which conform to set rules.

The basic parameters may comprise one or many of the following data: corresponding slot parameters for each SIM card, slot parameters for performing call-out communications, slot parameters for performing call-in communications and corresponding slot parameters for call logs. In specific embodiments, the basic parameters are corresponding parameter names, corresponding parameter values or corresponding parameter categories. In other embodiments, the basic parameters may comprise one or several parameters which can produce symbolic influences to communications and other functions of the mobile communications terminal during the work. For example, identifying call-our or call-in of a SIM card or a phone number or call log.

The implementation functions are one or many of the implementation function for identifying SIM number, one for identifying SIM card status, one for identifying SIM network attributes and one for SIM operators attributes. In other embodiments, the implementation functions also comprise others for identifying basic functional attributes of SIM card.

Those skilled in the art may appreciate differences between models or performances of mobile communications terminals may lead to the basic parameters including unmentioned parameter name or parameter value or parameter category, or the implementation functions including unmentioned functions, which shall not limit substantially the invention.

In one embodiment, basic parameter obtaining module 231 may comprise: monitoring module for monitoring the system event of the conversation process, to obtain corresponding system data; analyzing module for analyzing system data to determine basic parameters. The inventor finds: when the user is in the conversation process, for example, the user uses the system of the mobile communications terminal 110 to dial some number or receive incoming calls, a string of system data of slot parameters including performing call-out communications. The inventor further analyzes obtained system data so as to obtain the basic parameters.

The conversation process including one mentioned below may be answering calls, or making calls, or other instructions or actions related to conversations, which will not influenced no matter whether the call has been got through. In other embodiments, the conversation process can also be performing one operational instruction or sending texts to some phone number.

Specifically speaking, the analyzing module can compare and analyze corresponding system data from two system conversation processes to obtain changed data bits and determine basic parameters by determining data bits identifying basic parameters. In another embodiment, the analyzing module can set the string for filtering according to basic parameters and filter obtained system data according to the set string. In another embodiment, the analyzing module also can eliminate data bits fixed by the system.

In another embodiment, basic parameter obtaining module 231 is suitable to obtain slot parameters of the call log from the database of the mobile communications terminal 110.

In another embodiment, basic parameter obtaining 231 also comprises the interaction module which is suitable to prompt the user to use the mobile communications terminal 110 for system communications.

Implementation function obtaining module 232 may comprises scanning all system functions and also comprises scanning part of system functions. For example, by scanning setting locations of the system functions, obtain implementation functions of set rules.

In one embodiment, the implementation function obtaining module 231 may comprises query module, which is suitable to use the parameter name of setting the implementation parameter or the string of its subset for querying system functions. In other embodiments, the implementation function obtaining module 232 may comprise the contrast module which compares implementation functions in the system with summarized results of possible naming modes of all preset implementation functions to obtain preset implementation functions.

One or more configuration factors query module 220, configuration factors obtaining module 230 and configuration factors recording module 240 can be located in the mobile communications terminal 110 and the device outside the mobile communications terminal, like the cloud device. For example, configuration factors query module 220, configuration factors obtaining module 230 and configuration factor recording module 240 can be located in the mobile communications terminal together, or located in the device outside the mobile communications terminal, like the cloud device. Take another example, configuration factors obtaining module 230 is located in the mobile communications terminal, and configuration factors query module 220 and configuration factors recording module 240 are located in the device outside of the mobile communications terminal, like a cloud device, or vice versa. For another example, configuration factors query module 220 and configuration factors obtaining module 230 are located in mobile communications terminal and configuration factors recording module 240 are located in the device outside of the mobile communications terminal, like a cloud device, or vice versa. Take one more example, configuration factors obtaining module 230 and configuration factors recording module 240 are located in the mobile communications terminal and configuration factors query module 220 is located in the device outside of the mobile communications terminal, like a cloud device, or vice versa.

The database 120 can at least comprise the cloud terminal base 121 located in the cloud device. The database 120 also can comprise the cloud database 121 located in the cloud device and the local database 122 located in the mobile communications terminal 110. At this time, configuration factors query module 220 can query the local database 122 at first, and also can set the database which is be the first to be queried according to networking. Configuration factors record module 240 can preferably save obtained configuration factors in the cloud database 121, or save and synchronize obtained configuration factors in the cloud database 121 and local database 122, or select a database for saving configuration factors according to networking.

Figure 3:
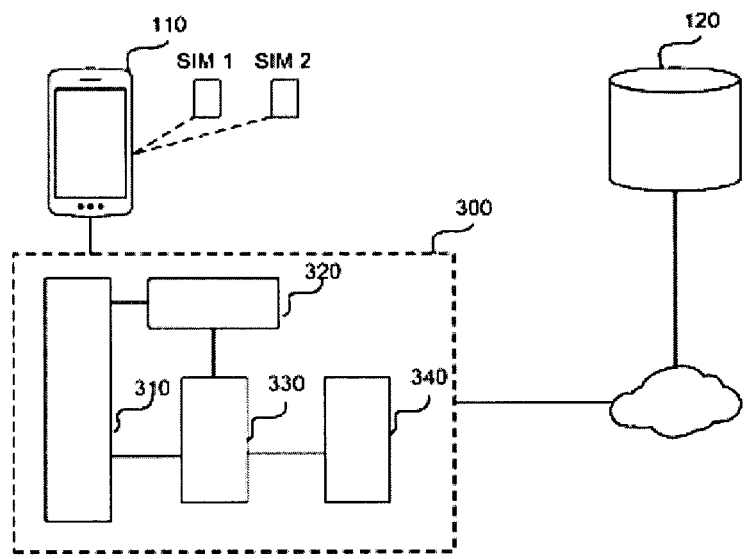
FIG. 3 shows the schematic diagram for another embodiment of the dual-sim cloud identification system.

FIG. 3 shows the frame diagram for another embodiment of the dual-sim cloud identification system. The dual-sim cloud identification device 300 comprises dual-sim query module 310, configuration factors query module 320, configuration factors obtaining module 330 and configuration factors recording module 340. The dual-sim query module 310 analyzes system parameters or functions of the mobile communication terminals 110 or interacts with users via the mobile communication terminals 110 to confirm whether it is a dual-sim device.

Specifically speaking, the dual-sim query module 310 comprises: implementation function obtaining module for querying implementation functions set in the mobile communications terminal 110; function confirming module for determining whether the name of the preset implementation function conforms to the dual-sim characteristics. At this time, the configuration factors obtaining module 330 applies to the conversation process of the monitoring system to obtain corresponding basic parameters on one hand; on the other hand, it can communicate with the implementation function obtaining module 311 to obtain preset implementation functions in one embodiment; the aforesaid embodiment can be used to scan system functions automatically in another embodiment, to obtain preset implementation functions.

In other embodiments, the dual-sim query module 310 can comprises: model obtaining module for obtaining the mobile communications terminal model: query module for querying whether the model is a dual-sim one according to the model. Specifically speaking, collect and summarize models of all dual-sim mobile communications terminals, query according to summarized results and confirm whether the mobile communications terminal 100 is a dual-sim model.

In other embodiments, the dual-sim query module 310 comprises the interaction module, for interacting with users with the mobile communications terminal. For example, query the user whether the mobile communications terminal is a dual-sim model, or prompt the user to confirm that it is single-card model or a dual-sim model.

In the dual-sim identification system of the present invention, basic parameters and implementation functions of the system are obtained via the dual-sim cloud identification device, so that configuration factors of the dual-sim mobile communications terminal are obtained rapidly and conveniently when they are blocked by the manufacturer, and it is not necessary to decompile each phone model, saving lots of manpower and material resources. The dual-sim cloud identification system is further equipped with the cloud database, to save obtained configuration factors in the cloud, and enable that configuration factors can be obtained by users with the same model phone more quickly and conveniently, reducing steps about manual recording and updating to the database of third-party software developer and greatly increasing efficiency.

Figure 4:
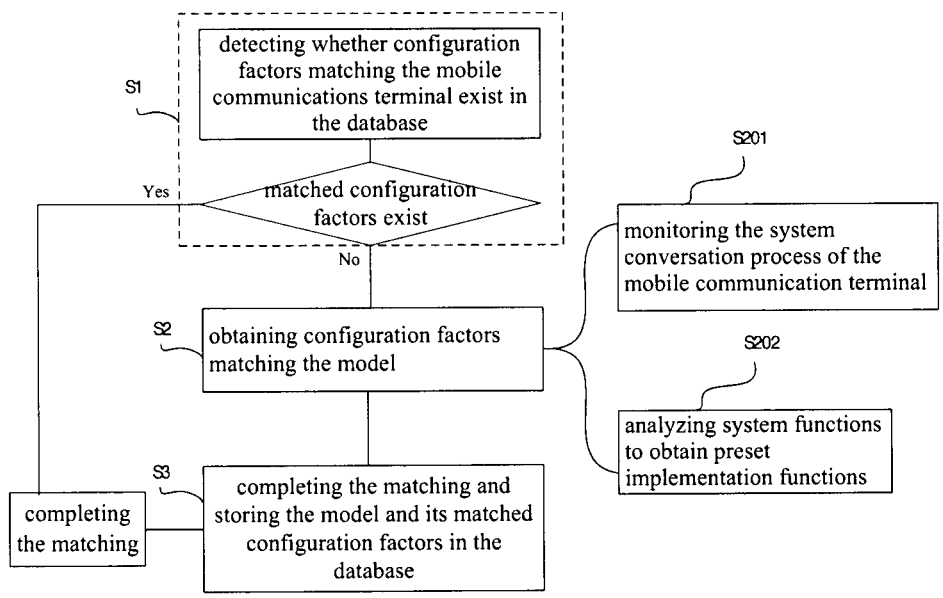
FIG. 4 shows the flow diagram for one embodiment of the dual-sim cloud identification system.

FIG. 4 shows a flow chart for one embodiment of the dual-sim identification method of the present invention. As shown in FIG. 4, the method may comprise:

In Step S1, detecting whether there exist matched configuration factors in the mobile communications terminal for the dual-sim communications terminal. The configuration factors comprise any one of basic parameters and implementation functions or combination thereof for providing the complete communication function. The complete communication function may comprise one or more functions as follows: designating SIM card or phone number to make calls or answer calls, providing operations for contact person for the designated SIM card or phone number to obtain call logs, incoming calls and outgoing calls and conducting IP operations for the designated SIM card or phone number and relating the designated SIM card or phone number to the specific social applications.

Specifically speaking, Step S1 may comprise: obtaining the mobile communications terminal model, querying in the database according to the model and completing the matching when matched configuration factors exist. The model of the mobile communications terminal may comprise the manufacturer name, serial number and specifications and production batch trace number.

In Step S1, when matched configuration factors exist, feedback matched configuration factors to the mobile communication terminal 110, for example, returning or downloading some or all basic parameters or implementation functions to the mobile communication terminal 110.

In one embodiment, Step S1 may comprise: prompting users that the matching exist or does not exist, or prompting users that the matched configuration factors do not exist via voice, vibration, picture or text.

When matched configuration factors do not exit, perform Step S2. Nonexistence of Matched configuration factors comprises: there are no configuration factors matching the model in the database, there exist errors on original configuration factors in the database and ones matching the model.

Specifically speaking, Step S2 comprises: analyzing system functions or data or monitor system events of the conversation system to obtain configuration factors of the mobile communications terminal.

In one embodiment, obtained configuration factors of the mobile communications terminal in Step S2 may comprise: obtaining corresponding basic parameters. The basic parameters may comprise at least one of the following parameters or combination thereof: slot parameters corresponding to each SIM card, one for performing call-out communications, one for performing call-in communications, and one corresponding to call logs. In other embodiments, the basic parameters may comprise others for providing the complete communication function, such as others which can produce symbolic influences on communications and functions of the mobile communications terminal during the work.

In one preferred embodiment, the conversation process of the system can be monitored to obtain corresponding basic parameters. When the user makes or answers calls with the mobile communications terminal, record and analyze system data via monitoring system events whether the call has been got through, so as to obtain the basic parameters.

In the specific implementation, recording and analyzing system data may comprise: comparing system data of two calls. Take the example of slot parameters for performing call-out communications. When the user dial the same phone number with SIM cards in two-card slot, compare sent system data. As the value of only one data bits is changed, it is known that the data bits are used to indicate slot parameters corresponding to the SIM card and that slot parameters respectively corresponding to SIM cards for two calls. For comparing system data during two calls, directly compare system data obtained from two calls, set one referenced value and compare system data obtained from two calls with it to obtain the basic parameters.

In another embodiment recording and analyzing the system data may comprise: confirming set string according to basic parameters filtering the system data with the set string. For example, the string is set as SIM or slot or combinations of letters which indicate basic parameters. According to the string, retrieving names of each data bit of the system data to determine the data bit for identifying slot parameters or other basic parameters, and further obtaining slot parameters or other basic parameters corresponding to each SIM card.

In another embodiment, excluding fixed parameters of the system. Specifically speaking, there are some fixed data bits in the system data, such as time and call duration. Although values thereof will change during different calling process, these fixed parameters cannot be defined by the manufacturer during the manufacturing the mobile communications terminal, so they cannot become data bits identifying basic parameters. Excluding these fixed parameters of the system can effectively increase the efficiency of obtaining basic parameters.

In another embodiment combine the implementation modes. For example, when system data of two calls are compared to find that more than one data bit change, analyze each changed data bit filter these changed data bits with the set string and exclude set parameters of the changed data bits to obtain basic parameters.

In addition, obtain values of slot parameters by visiting the database of the mobile communications terminal, and combine the implementation modes, so as to obtain corresponding basic parameters.

In other embodiments, before obtaining basic parameters, triggering system communication process is also included. Specifically speaking, various modes are included. For example, promoting the user to use SIM cards in different slots to make calls or dial the set phone number via the system communications, to trigger the system communications process and obtain system communication data; for example, monitoring user's communications process without any prompts. When the user makes or answer calls using the system communications method, analyze system events and obtain system communications data.

In one embodiment, obtained configuration factors of the mobile communications terminal in Step S2 may comprise: obtaining preset implementation functions.

After lots of practices and statistics about all dual-sim models on the market by the inventor, it is found that the function name of some implementation functions in the dual-sim model has a specific naming method, for example, including specific grammars. The preset implementation functions can be one or several implementation functions of one identifying SIM number, one identifying SIM card status, one identifying SIM network attributes and one identifying SIM operator attributes. In another embodiment, preset implementation functions also can comprise ones for providing the complete communication function, for example, other identifying basic functional attributes of SIM cards.

Obtaining preset implementation functions may comprises: querying system functions with the name of the preset implementation function or the string of its subset. In another embodiment, obtaining implementation function may comprises: summarizing possible naming methods for each preset implementation function; comparing the implementation function of the system with summarized results, to determine whether preset implementation functions exist.

In one embodiment, obtaining preset implementation functions may further comprise: setting query location. The inventor researches and counts up all universal dual-sim models on the market and found that appearance locations of implementation functions thereof conform to certain rules. Querying implementation functions at set query locations can greatly increase the query efficiency. Of course, preset implementation functions can be obtained via traversing all system functions.

In addition, after obtaining preset implementation functions, obtaining the name of other implementation functions according to the preset implementation functions. For example, Getline number is used as the name of the implementation function identifying SIM card number, that is, the naming rule of other implementation functions in the model conforms to the first category, when Getline number is used as the name of the implementation function identifying SIM card number, the naming rule of other implementation functions in the model conforms to the second category.

As for Step S3, after obtaining configuration factors of the mobile communications terminal, complete the matching and store the model and its matched configuration factors in the database.

Specifically speaking, obtained basic parameters and/or implementation functions are updated to the cloud database.

After that, only when the mobile communications terminal device with the same model is querying, matched basic parameters and/or implementation functions can be obtained, so that matched configuration factors can be used to provide the complete communication functions and meet users' requirements.

Figure 5:
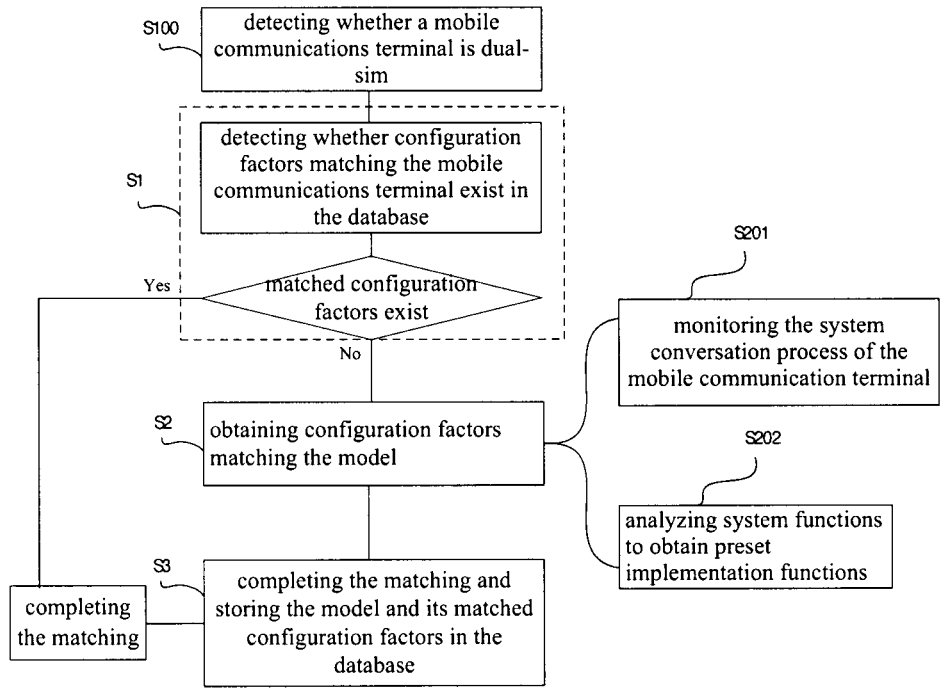
FIG. 5 shows the flow diagram for another embodiment of the dual-sim cloud identification system.

FIG. 5 shows another embodiment of the dual-sim identification system. Before Step S1, Step S100 may be also included to detect whether the mobile communications terminal 110 is dual-sim. Due to restrictions of the manufacturer, usually the third-party communications software cannot directly read parameters of the mobile communications terminal, even some models cannot visit the database storing system parameters. Whether the mobile communications device is dual-sim can be detected only via analyzing system functions or parameters or models or interacting with users.

In one embodiment. Step S100 further comprise: Step S101. Scan implementation functions of the system and determine whether the mobile communications device is dual-sim via judging the function name.

Specifically speaking, Step S101 may comprise: using the string including the name of implementation function or its subset to query system functions; after querying preset implementation functions, determining whether the name of these implementation functions conform to dual-sim characteristics. Each preset implementation function can be confirmed. When it meets dual-sim characteristics, the mobile communications terminal is deemed as the dual-sim model. Certain numbers can be set. When the numbers of preset implementation functions reach set numbers, that is the mobile communications terminal is deemed as the dual-sim model.

In other embodiments. Step S101 can be fulfilled through the following steps: summarizing possible dual-sim characteristics of each preset implementation function; comparing implementation functions of the system with summarized results to determine whether preset implementation functions conforming to dual-sim characteristics exist, so as to obtain the judging result about whether the mobile communications terminal is dual-sim model.

When Step S101 is used to determine that the mobile communications terminal is dual-sim model, directly obtain its configuration factors according to preset implementation functions obtained from Step S101 in the subsequent Step S2.

In another embodiment. Step S100 may comprise: summarizing all dual-sim models, such as names of manufacturers and models of the mobile communications terminal; obtaining models of the mobile communications terminal, and then query according to the models, to confirm whether the mobile communications terminal is dual-sim.

In another embodiment, Step S100 may comprise querying system functions of the mobile communications terminal and detecting numbers indicating slot parameters. Specifically speaking, use the string with a specific field to retrieve, such as SIM or slot, and obtain parameters for indicating slots. When more than one parameter including the string exist, such as slot 1 and slot 2, the mobile communications terminal is determined as the dual-sim model.

In another embodiment Step S100 may comprise: interacting with the user to further obtain detection results of the mobile communications terminal. For example, asking the user whether the mobile communications terminal is a dual-sim model or that it is a single-card model or dual-sim one. The single interaction method is adopted to obtain detection results whether the mobile communications terminal is a dual-sim model or the single interaction method combines with one or several embodiments to verify whether the mobile communications terminal is a dual-sim model.

When detecting the mobile communications terminal is the dual-sim type, implement Step S1. If the matching of the dual-sim mobile communications terminal is not successfully with the dual-sim cloud identification mode, scan system functions and analyze obtained data from the system conversation, to obtain configuration factors corresponding to the mobile communications, change the mode to decompile each phone according to conventional methods, and greatly increase efficiency.

Figure 6:
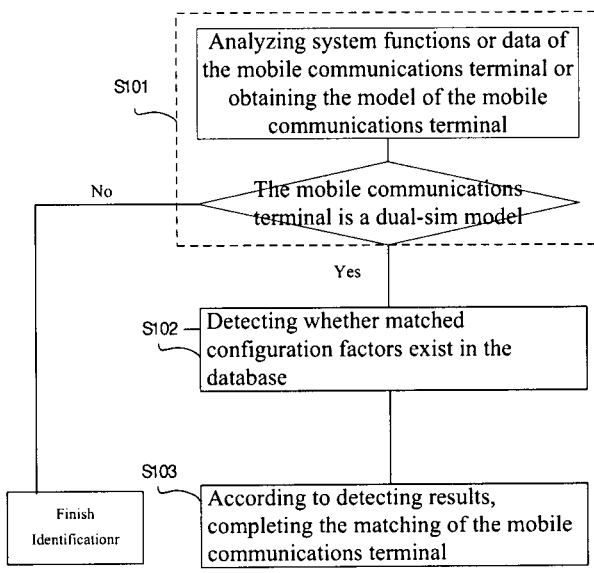
FIG. 6 shows the flow diagram for another embodiment of the dual-sim cloud identification system.

In FIG. 6, the present invention provides an embodiment of the dual-sim identification method, specifically speaking, comprising: Step S1101: analyzing the system functions or data of the mobile communications terminal or determining whether the mobile communications terminal is a dual-sim model according to its model; Step S1102: detecting whether there are configuration factors matching the SIM card of the mobile communications terminal in the database when it is confirmed to the dual-sim device, wherein, the configuration factors comprises at least one of basic parameters and implementation functions for providing the complete communication function; Step S1103: completing the matching of the mobile communications terminal according to detection results.

In Step S101, any of the embodiment can be used to query if the mobile communications terminal is a dual-sim device. For example, summarizing models of all dual-sim mobile communications terminal, querying according to its models and determining whether the mobile communications terminal is a dual-sim model; or querying system functions, and determining whether the mobile communications terminal is a dual-sim model according to the numbers of parameters indicating slots; or query system functions by setting the name of implementation functions or the string of its subset; or summarizing possible naming methods of each preset implementation functions and comparing implementation functions with summarized results to obtain preset implementation functions.

When detecting that the mobile communications terminal is a dual-sim device, implement Step S1102. When configuration factors matching the mobile communications terminal are retrieved in the database, download the matched configuration factors or transmit them to the mobile communications terminal to complete the matching.

Figure 7:
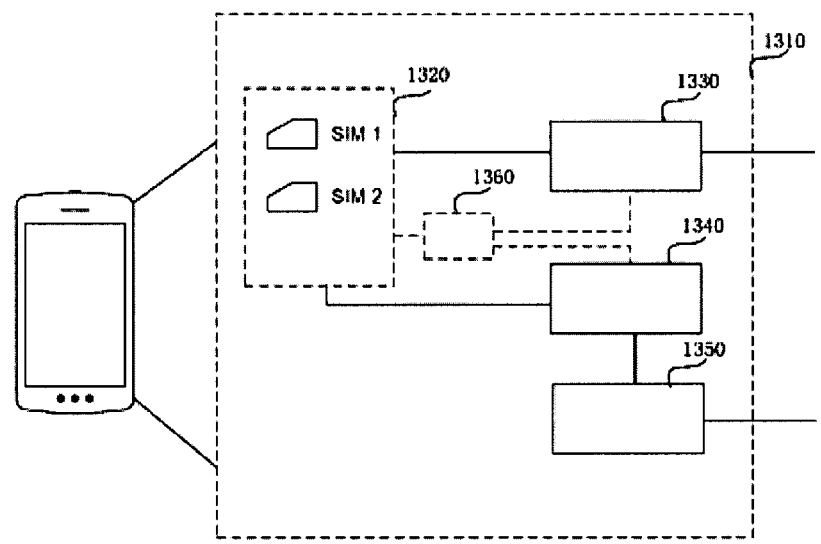
FIG. 7 shows the structure diagram for one embodiment of mobile communications device to which the dual-sim identification method is applied.

In FIG. 7, this present invention also provides a mobile communications terminal device with the dual-sim identification method. In one embodiment the device 1310 comprises: slot 1310 with the dual-sim functions, query module 1330, obtaining module 1340 and transmitting module 1350.

Query module 1330 is suitable to send detecting data, detect whether the mobile communications terminal 1310 has matched configuration factors and receive matching results of the mobile communications terminal 1310;

Obtaining module 1340 is suitable to monitor and analyze system events of the system conversation process, or analyze system functions or data to obtain configuration factors matching the mobile communications terminal.

Transmitting module 1350 is suitable to transmit obtained configuration factors via the network.

Specifically speaking, the configuration factors comprise at least one of basic parameters for providing a complete communication function and implementation functions.

Basic parameters comprise slot parameters corresponding to each SIM card, ones performing call-out communications, ones performing call-in communications one of slot parameters corresponding to call lots or combination thereof. In other embodiments, the basic parameters may also comprise parameters which produce symbolic influences to communications and other functions of the mobile communications terminal during the work.

The implementation functions may be one or many of functions: an implementation function identifying SIM number, an implementation function identifying the status of SIM card, an implementation function identifying SIM network attribute and an implementation function identifying SIM operator attribute. In other embodiments, the implementation functions may be others identifying basic functional attributes of SIM cards.

In one embodiment, obtaining module 1340 can further comprise promoting the user to use the mobile communications terminal to trigger the system conversation process. For example, prompting the user to use different SIM cards to make or answer calls, in order to complete monitoring the system even of the conversation process to obtain system data.

In one embodiment, the query module 1330 can further comprise obtaining the model of the mobile communications terminal, such as the manufacturer name, its serial number and specifications and production batch trace number. After that, the query module 1330 sends obtained model and obtain query results.

In one embodiment, the transmission module 1350 can transmit the basic parameters and/or implementation functions to the cloud database, or other device connecting with the mobile communications device, like other mobile communications devices.

In another embodiment, the mobile communications terminal 1310 can further comprise the display module which displays matched results of the mobile communications terminal to the user.

In another embodiment, the mobile communications terminal 1310 can further comprise the dual-sim detection module 1360, which detecting whether the mobile communications terminal 1310 is a dual-sim model. In one specific embodiment, the dual-sim detection module 1360 can scan system functions to obtain preset implementation functions and determine whether the name of the preset implementation function conforms to dual-sim characteristics so as to determine whether the mobile communications terminal 1310 is a dual-sim model. In another specific embodiment, the dual-sim detection module 1360 can query according to the model of the mobile communications terminal 1310, in order to confirm whether it is a dual-sim model. In another specific embodiment, the dual-sim detection module 1360 can interact with the user and determine whether the mobile communications terminal 1310 is a dual-sim model according to the user's input.

Figure 8:
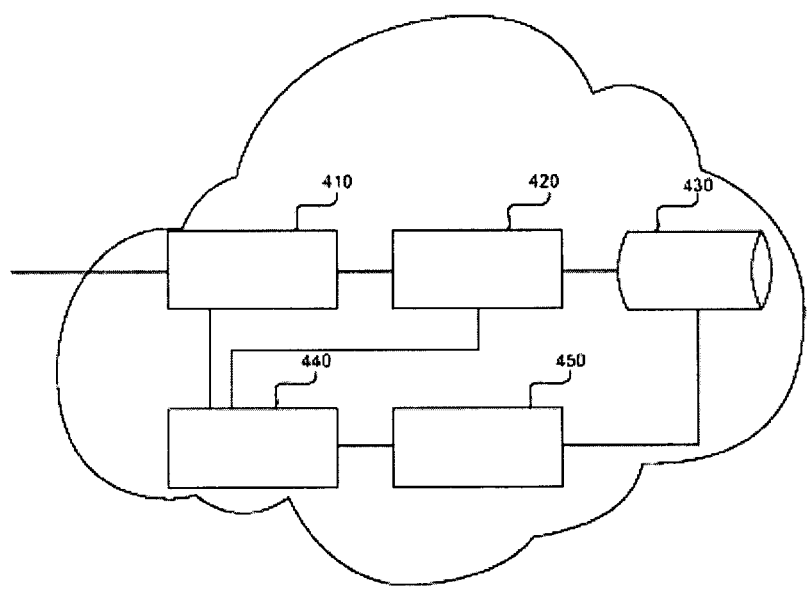
FIG. 8 shows the structure diagram for one embodiment of the network device to which the dual-sim identification method is applied.

In FIG. 8, this present invention also provides one network device in which the dual-sim identification method is applied. In one embodiment, the device may comprise:

Receiving module 410 is suitable to receive instructions or data from the designated mobile communication terminal, which can be but not limited to a dual-sim device; for example, the designated mobile communication terminal can be one or several dual-sim devices, or one or several single-card devices, or combinations of dual-sim devices and single-card devices.

The database 420 is suitable to save models of the mobile communications terminal and matched configuration factors;

The query module 430 is suitable to query in the database 420, according to instructions or data received by the receiving module 410, and feedback query results;

Obtaining module 440 is suitable to compare data received by the receiving module 410, to obtain corresponding configuration factors of the designated mobile communications terminal when matched configuration factors do not exist on the designated mobile communications terminal. The configuration factors comprise at least one of basic parameters for providing the complete communication function and implementation functions.

Saving module 450 is suitable to save configuration factors from the obtaining module 440 in the database 420.

The complete communication function may comprise one or more functions as follows: designating SIM card or phone number to make calls or answer calls, providing operations for contact person for the designated SIM card or phone number to obtain call logs, incoming calls and outgoing calls and conducting IP operations for the designated SIM card or phone number and relating the designated SIM card or phone number to the specific social applications. The basic parameters may comprise one of the data or combination of data: data indicating the corresponding identification number of the slot, the status value of the corresponding SIM card for each slot, SIM card call logs, incoming calls of SIM card, or parameters which produce symbolic influences on communications or other functions of the mobile communications terminal during the work. The implementation functions comprise one or several parameters of identifying SIM card number, identifying SIM card status, identifying SIM network attributes, identifying SIM operator attributes, or other parameters identifying basic functional attributes of SIM CARD.

In one embodiment, receiving module 410 receive the model of the designated mobile communications terminal and query whether the model has matched configuration factors. Query model 430 queries the model in the database 420 according to the instruction, and return the configuration factor to the mobile communications terminal when the matched configuration factor exists or feedback the query result of no matched configuration factors to the mobile communications terminal when the matched configuration factor does not exist. In one embodiment, when configuration factors matching the model do not exist in the database 420, the receiving module 410 further transmits implementation functions from the designated mobile communication terminals and system communications data inclusive of basic parameters to obtaining module 440. Obtaining module 440 further analyze the system communications data to obtain basic parameters, like comparing data values of each data bit.

In another embodiment when when configuration factors matching the model do not exist in the database 420, obtaining module 440 receives system communications data from the designated mobile communications terminal and further analyze them to obtain basic parameters on one hand; on the other hand, obtaining module 440 scan the designated mobile communications terminal to obtain implementation functions.

The dual-sim identification method, device and system provided by this present invention, as well as mobile communications terminal and cloud devices in which the dual-sim identification method applies are all applicable to third-party communications software of TouchPal Dialer®.

Comparing to prior arts, each embodiment of the present invention is that by scanning system functions to obtain corresponding implementation functions and monitoring system communications process to obtain corresponding basic parameters, necessary configuration factors are obtained for the mobile communications terminal with at least two SIM cards to perform the complete communications function, so that restrictions of relying on decompling in the conventional methods can be exempted and it is not necessary to keep pace with the manufacturers to buy new models, greatly saving manpower and financial costs of third-party communications software development.

In addition, in each implementation method of the present invention, even if configuration factors matching the user's model do not exist in the database, the user can obtain configuration factors matching his/her model by simple operations, and save them in the database via the network, so that other users who own the same model and can match via the database obtain them. Whether the model is the main-stream one is not a restrictive condition, which greatly optimizes the user's experience.

Those skilled in the art can understand that the SIM card in the present invention is a smart chip or person identification chip equipped with the mobile communications terminal, which can save the user's information, encryption keys, contact logs and contact person list and provide user's personal identification and encrypt voice information when the customer calls. The SIM card also can be micro SIM card or namo SIM card. Double cards in the present invention is not limited to two SIM cards or other communications cards, and are applicable to more than two SIM cards or other communications cards, and one SIM card with two or more phone numbers. Accordingly, basic parameters of the configuration factors may also comprise other parameters which can distinguish different numbers on different SIM cards or the same SIM card.

In the specifications and claims, the term "comprise" or similar terms means non-exclusive inclusion. To comprise methods or means of a series of components not only comprise those components which are listed individually, but also comprise those which are not listed. Embodiments of the present invention are presented and described specifically the. It shall be understood that the present invention is not limited to exposed embodiments. On the contrary, the present invention intends to cover various revisions and equivalent arrangement in the spirits and scope of the claims.

The invention claimed is:

1. A dual-sim cloud identification method applicable to a dual-sim mobile communications terminal or a device communicating with the dual-sim mobile communications terminal, wherein said method comprises:
   detecting whether a configuration factor matching each SIM card exists in the mobile communications terminal, wherein the configuration factor comprising at least one of a basic parameter and an implementation function for providing a complete communications function;
   implementing the matching, when the matched configuration factors exist;
   obtaining a matched configuration factor, when the matched configuration factors do not exist, by analyzing a system function or data, or monitoring and analyzing a system event of a conversation process and applying the obtained configuration factor to the mobile communications terminal application to complete the matching, and storing said configuration factor.

2. The method according to claim 1, wherein said obtaining a matched configuration factor further comprises obtaining a matched basic parameter, wherein said basic parameters comprise at least one of the following parameters or combination thereof: a slot parameter matching each SIM card, a slot parameter performing call-out communications, a slot parameter performing call-in communications and a slot parameter corresponding to call logs.

3. The method according to claim 2, wherein said obtaining a matched basic parameter further comprises any one of the following means or combination thereof:
   comparing system data of twice conversation processes and obtaining a basic parameter according to data bits with changed values;
   filtering system data according to the string formed by letters which is used to indicate said basic parameters to obtain a basic parameter; or
   excluding fixed parameters from the system data to obtain the basic parameters.

4. The method according to claim 1, wherein said obtaining a matched configuration factor further comprises obtaining a preset implementation function, wherein the preset implementation function comprises one or more of the following implementation functions: an implementation function identifying SIM card number, an implementation function identifying SIM card status, an implementation function identifying SIM card network attributes and an implementation function identifying SIM card operator attributes.

5. The method according to claim 1, wherein before detecting whether a matched configuration factor exists, further comprises: by analyzing system functions or parameters or models or interacting with the user, detecting whether the mobile communications terminal is a dual-sim one.

6. The method according to claim 5, wherein said analyzing system functions or parameters comprises obtaining a preset implementation function.

7. The method according to claim 6, wherein said obtaining a preset implementation function comprises one of the following method or combination thereof:
   querying system functions by setting the string of the name of implementation functions or its subset; or
   summarizing possible naming methods of each preset implementation functions and comparing implementation functions with summarized results to obtain preset implementation functions;
   setting a query location and scanning system functions at the set query location.

8. The method according to claim 6, wherein after obtaining set system functions, further comprises: obtaining other implementation functions according to preset implementation functions.

9. The method according to claim 6, wherein after obtaining preset implementation functions, further comprises: determining whether the mobile communications terminal is a dual-sim one according to preset implementation functions.

10. The method according to claim 5, wherein said detecting whether the mobile communications terminal is a dual-sim one comprises any one of the following methods or combinations thereof:
   summarizing models of all dual-sim mobile communications terminal,
   querying according to its models and determining whether the mobile communications terminal is a dual-sim model; or querying system functions, and determining whether the mobile communications terminal is a dual-sim model according to the numbers of parameters indicating slots.

11. The method according to claim 1, wherein further comprises: obtaining a model of the mobile communications terminal, wherein said model comprises one of the following or combinations: manufacturer name of the mobile communications terminal manufacturer, serial number and specifications and production batch trace number.

12. The method according to claim 1, wherein before analyzing system functions or data or monitoring and analyzing system events of a conversation process, further comprises: prompting the user to trigger the system communication process.

13. The method according to claim 12, wherein said prompting the user to trigger the system communications further comprises: prompting the user to use one SIM card to make a call firstly and then use another SIM card to make a call.

14. The method according to claim 1, wherein further comprises: detecting whether matched configuration factors exist or saving obtained configuration factors in at least one or combination of the local database or cloud database.

15. The method according to claim 1, wherein when matched configuration factors exist, further comprises: return part or all basic parameters or implementation functions or download them to the mobile communications terminal.

16. A dual-sim identification system, wherein comprises:
a dual-sim mobile communications terminal;
a database, adapted to store models of the mobile communications terminal and matched configuration factors;
a dual-sim identification device, adapted to communicate with the mobile communications terminal and the database to achieve a matching of the mobile communications terminal;
wherein, the dual-sim identification device further comprises:
a configuration factors query module, adapted to query whether configuration factors matching the mobile communications terminal exist in the database;
a configuration factors obtaining module, adapted to analyze system functions or data, or monitor system events of a conversation process, and obtain configuration factors matching the SIM card of the mobile communications terminal;
a configuration factors recording module, adapted to record, in the database, models of the mobile communications terminal and configuration factors obtained by the configuration factors obtaining module;
wherein, the configuration factors comprise at least one of a basic parameter or an implementation function for providing a complete communication function.

17. The system according to claim 16, wherein said configuration factor obtaining module further comprises:
a basic parameter obtaining module for monitoring system communication system of the mobile communications terminal to obtain basic parameters;
wherein the basic parameters comprise one of the following parameters or combinations thereof: a slot parameter corresponding to each SIM card, a slot parameter for performing call-out communications, a slot parameter for performing call-in communications, and a slot parameter corresponding to call logs.

18. The system according to claim 16, wherein said configuration factor obtaining module further comprises:
an implementation function obtaining module for scanning system functions to obtain an implementation function which conforms to a preset rule; wherein said implementation function comprises one or more of the following implementation functions: an implementation function for identifying SIM number, an implementation function for identifying SIM card status, an implementation function for identifying SIM network attributes and an implementation function for SIM operators attributes.

19. The system according to claim 16, wherein one or more of the configuration factor query module, the configuration factor obtaining module and the configuration factor recording module is located in at least one of the mobile communications terminal or the cloud device connecting with the mobile communications terminal.

20. The system according to claim 16, wherein said database comprises a cloud database.

21. The system according to claim 16, wherein said dual-sim identification device comprises: a dual-sim query module for analyzing system parameters or functions or models of the mobile communications terminal or interacting with the user with the mobile communications terminal to confirm whether the mobile communications terminal is a dual-sim device.

22. The system according to claim 21, wherein said configuration factor obtaining module is adapted to communicate with the dual-sim query module to obtain preset implementation functions, and monitor and analyze system events of a conversation process of the mobile communications terminal to obtain basic parameters.

23. A mobile communications terminal device comprises:
a dual-sim slot;
a query module, adapted to send detection data, to detect whether a configuration factor matching the mobile communications terminal exists and receive a matching result of the mobile communications terminal;
an obtaining module, adapted to analyze system functions or data or monitor and analyze system events of a conversation process to obtain a configuration factor of the mobile communications terminal;
a transmitting model, adapted to transmit said obtained configuration factor via the network;
wherein said configuration factor comprises at least one of basic parameters or implementation functions for providing the complete a communication function.

24. The device according to claim 23, wherein said obtaining module is adapted to monitor a system communication process and analyze system data to obtain a basic parameter, wherein said basic parameter comprises one of the following data or combinations: a parameter value of the slot corresponding to each SIM card, a parameter value of the slot relating to performing call-out communications, a parameter value of the slot relating to performing call-in communications and a parameter value of the slot corresponding to call logs.

25. The device according to claim 23, wherein said obtaining module is adapted to analyze a system function to obtain a preset implementation function, wherein said implementation function is one or more of the following: an implementation factor identifying SIM number, an implementation function identifying SIM card status, an implementation function identifying SIM network attributes and an implementation function identifying SIM operator attributes.

26. The network device according to claim 23, wherein said basic parameter comprises one or combinations of the following parameters: a parameter value of the slot corresponding to each SIM card, a parameter value of the slot relating to performing call-out communications, a parameter value of the slot relating to performing call-in communications and a parameter value of the slot corresponding to call logs; or said implementation function comprises one or more implementation functions: an implementation factor identifying SIM number, an implementation function identifying SIM card status, an implementation function identifying SIM network attributes and an implementation function identifying SIM operator attributes.

* * * * *